(12) United States Patent
Machan

(10) Patent No.: US 8,686,312 B2
(45) Date of Patent: Apr. 1, 2014

(54) WELD CAP CHANGING TOOLS

(75) Inventor: Trevor Machan, Baden (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 402 days.

(21) Appl. No.: 13/071,998

(22) Filed: Mar. 25, 2011

(65) Prior Publication Data

US 2012/0241415 A1 Sep. 27, 2012

(51) Int. Cl.
*B23P 19/04* (2006.01)
*B23K 11/30* (2006.01)

(52) U.S. Cl.
USPC ............................... 219/86.8; 29/253; 29/270

(58) Field of Classification Search
USPC .................... 219/86.8; 29/253, 270, 275, 278; 254/21, 22, 24, 25, 28, 131
See application file for complete search history.

(56) References Cited

U.S. PATENT DOCUMENTS

| | | | |
|---|---|---|---|
| 2,245,838 A | 6/1941 | Taylor | |
| 2,673,063 A | 3/1954 | Weinman | |
| 3,753,283 A | 8/1973 | Dyer et al. | |
| 4,417,487 A | 11/1983 | Stephens | |
| 4,649,613 A * | 3/1987 | Bednarik | 29/253 |
| 5,070,568 A | 12/1991 | Wilcox et al. | |
| 5,492,040 A * | 2/1996 | Bellas | 81/125.1 |
| 5,686,000 A | 11/1997 | Nilsson | |
| 5,974,917 A | 11/1999 | Way | |

* cited by examiner

*Primary Examiner* — Brian Jennison

(74) *Attorney, Agent, or Firm* — Dinsmore & Shohl LLP

(57) ABSTRACT

A weld cap changing tool for removing weld caps from weld shanks includes an elongated shaft portion, a first weld cap removing portion that includes two prongs extending away from the shaft portion to free distal ends, the two prongs of the first weld cap removing portion being separated by a first characteristic gap, and a second weld cap removing portion that includes two prongs extending away from the shaft portion to free distal ends, the two prongs of the second weld cap removing portion being separated by a second characteristic gap. When the weld cap changing tool is in a first engagement position, the first weld cap removing portion engages the first weld cap and, and when in a second engagement position different from the first engagement position, the second weld cap removing portion engages the second weld cap of a different size than the first weld cap.

16 Claims, 11 Drawing Sheets

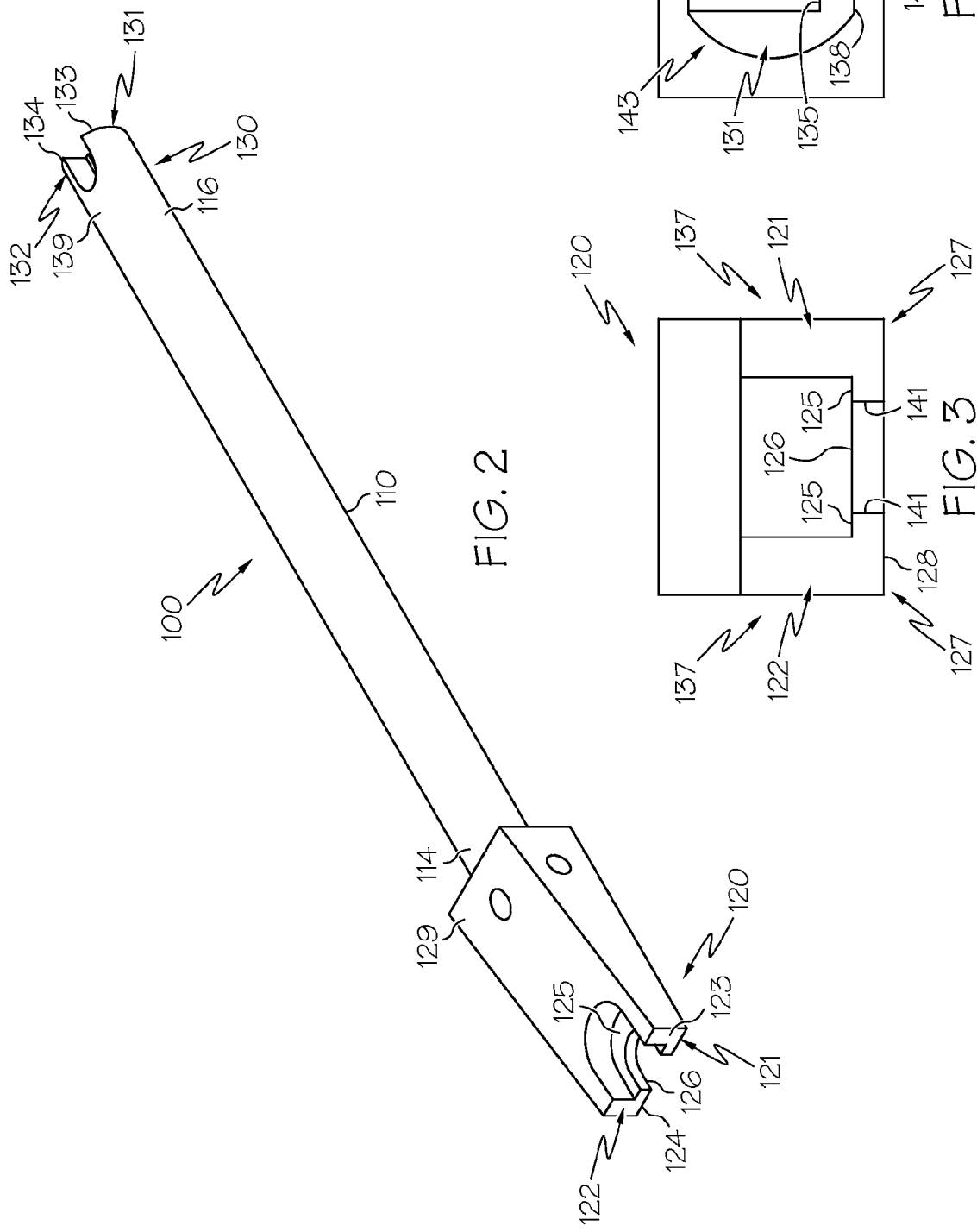

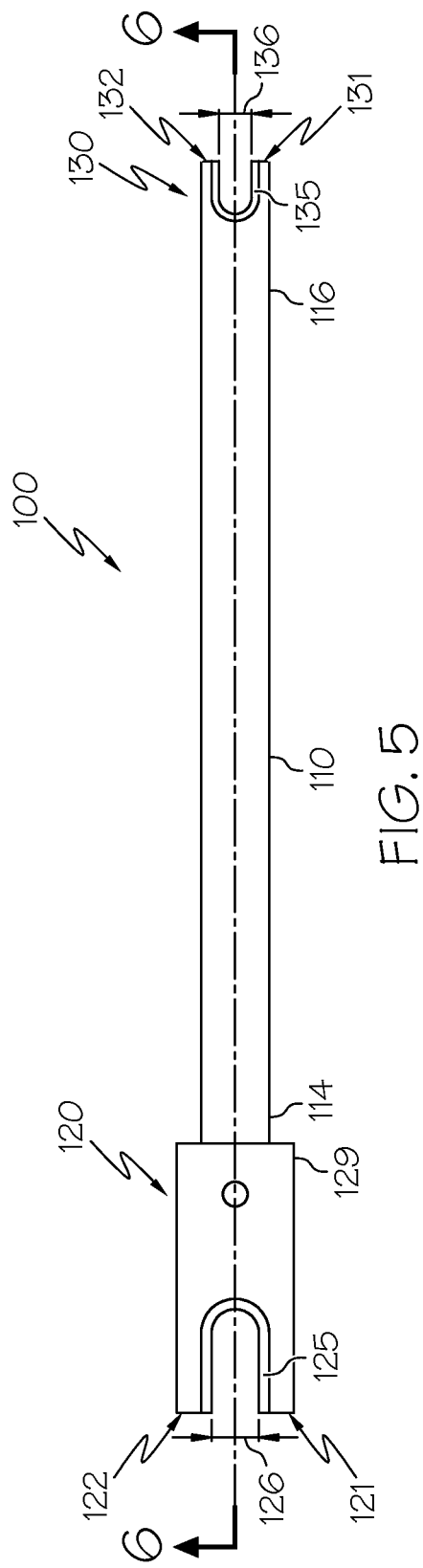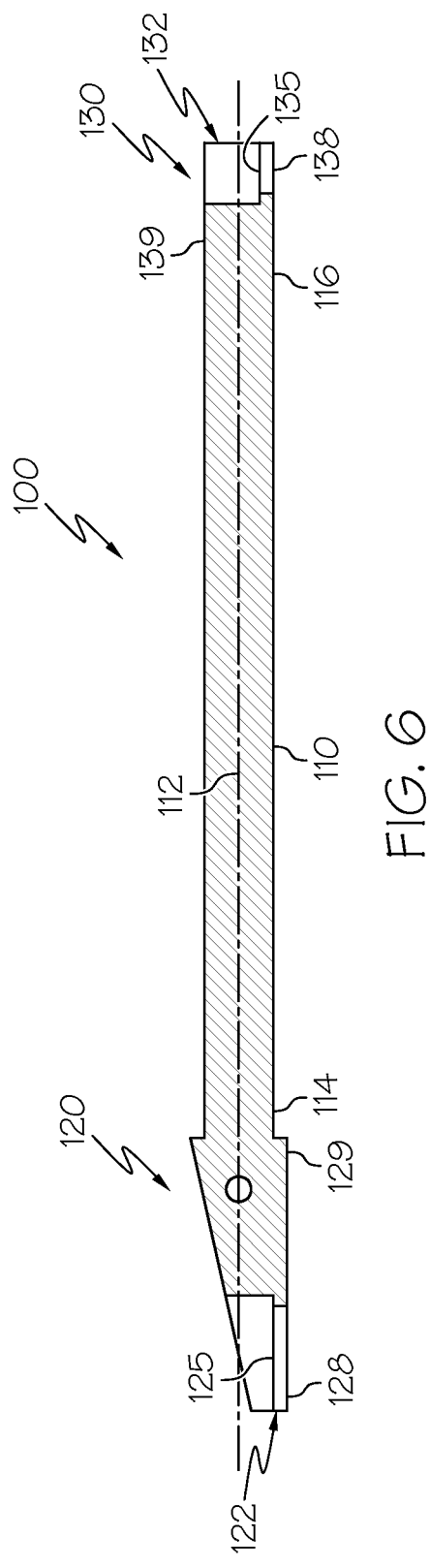

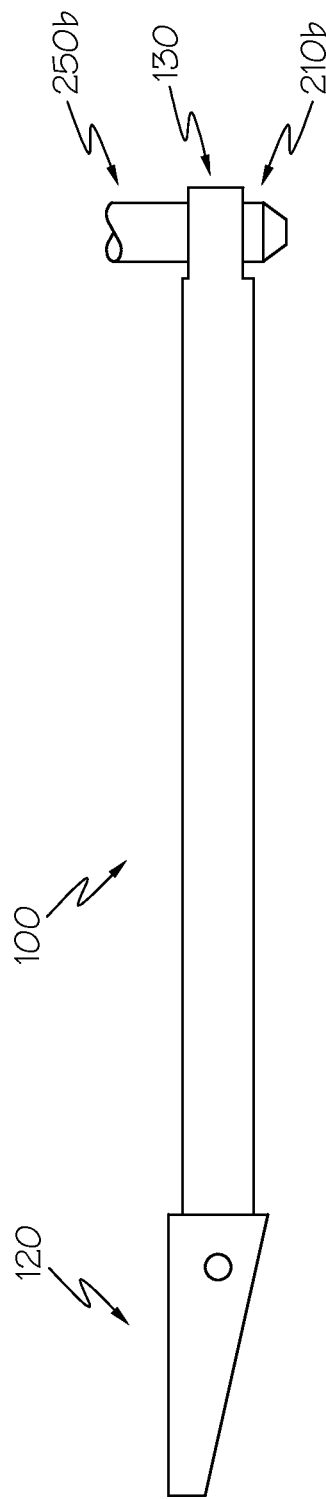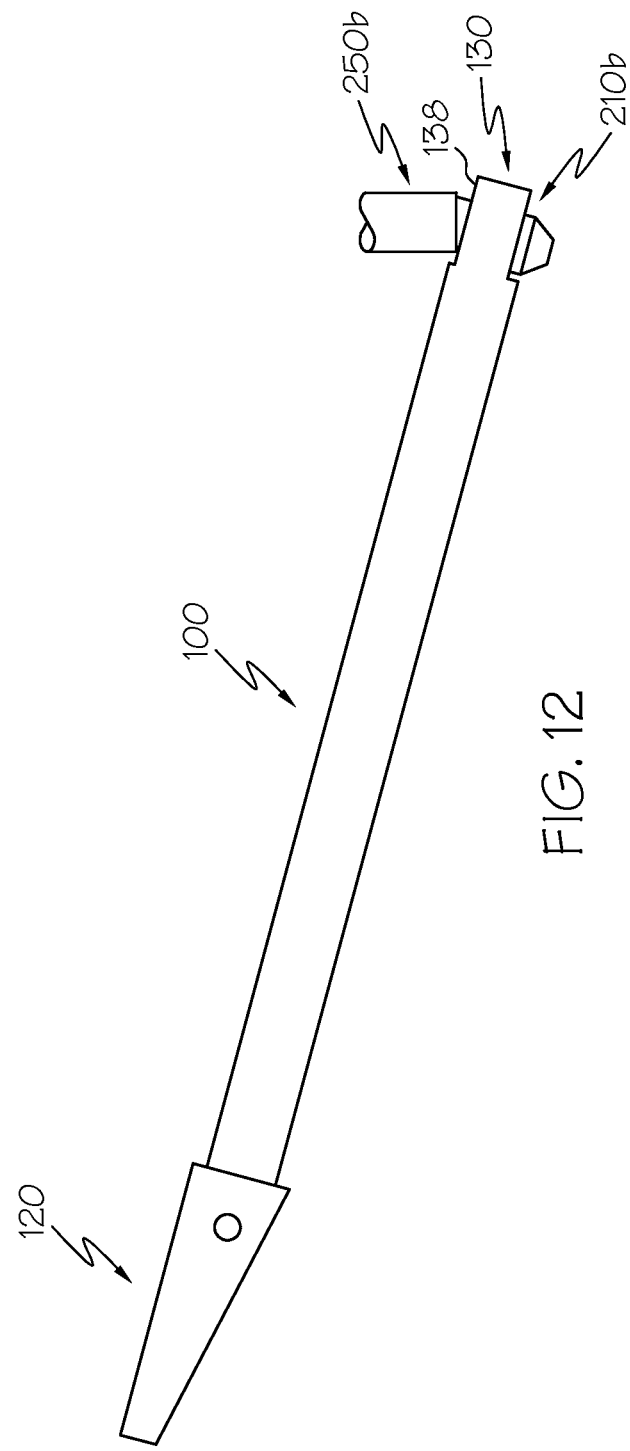

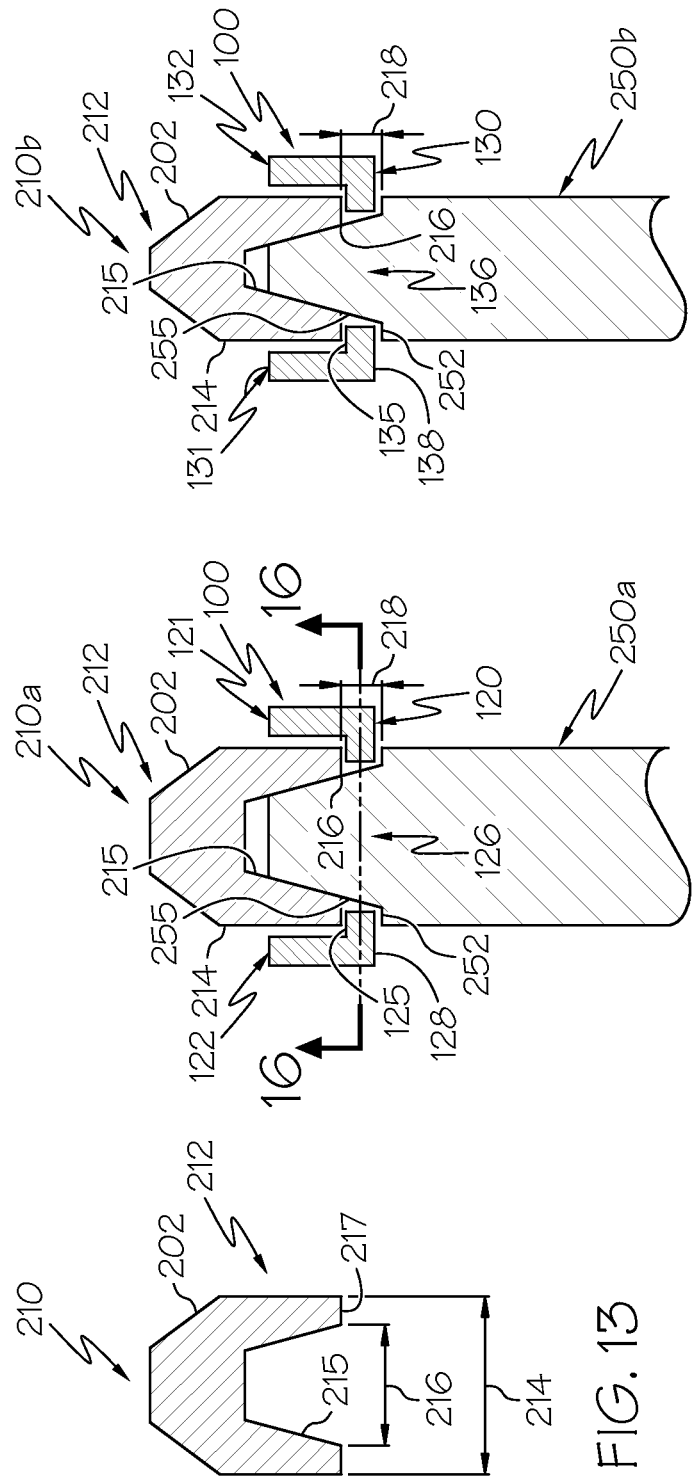

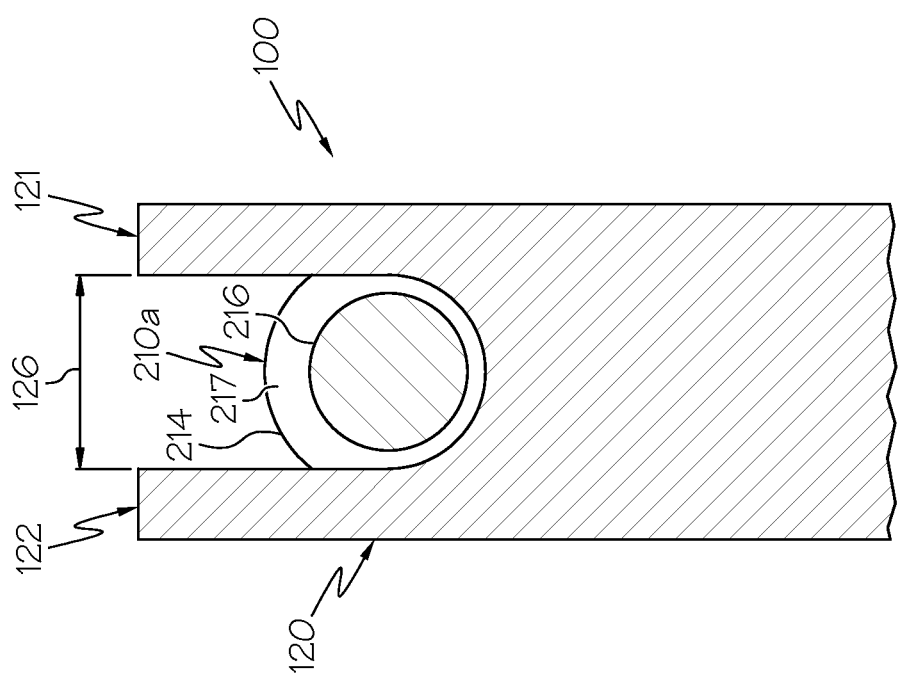

WELD CAP CHANGING TOOLS

TECHNICAL FIELD

The present specification generally relates to tools for removing consumable weld caps from resistance welding machines.

BACKGROUND

Welding processes join two work pieces of similar material together by increasing the temperature of the work pieces and fusing the work pieces to one another. Resistance spot welding is a welding process that passes electrical current through adjacent work pieces of metal. Adjacent work pieces are held together by electrodes, and electrical current is passed from one electrode to another through the work pieces. The electrical current locally heats the adjacent work pieces such that the work pieces become permanently adjoined to one another.

The properties of the spot weld may be affected by the amount and duration of electrical current passed through the electrodes, the material properties of the adjacent work pieces, and the shape and the size of the electrodes. Because the adjacent work pieces are held together by the electrodes, the electrodes have a tendency to wear and/or deform as more spot welds are processed. In production environments, the contacting portion of the electrodes, the weld caps, are often replaced to control the electrode shape, and therefore the spot weld properties.

Removal of weld caps from weld shanks of resistance spot welding machines may be difficult due to the size and orientation of the weld caps relative to the weld shanks. Removal operations may require application of force in particular regions of the weld caps. Additionally, weld caps are available in a variety of sizes and configurations to mate with a variety of weld shank sizes and types. Accordingly, weld cap changing tools that remove various sizes and/or types of weld caps from weld shanks are required.

SUMMARY

In one embodiment, a weld cap changing tool for removing weld caps from weld shanks includes an elongated shaft portion having an elongated axis extending along a length of the shaft portion. The weld cap changing tool also includes a first weld cap removing portion that includes two prongs extending away from the shaft portion to free distal ends, the two prongs of the first weld cap removing portion being separated by a first characteristic gap that is sized to position at least part of the first weld cap removing portion beneath at least a portion of a first weld cap for a removal operation. The weld cap changing tool further includes a second weld cap removing portion that includes two prongs extending away from the shaft portion to free distal ends, the two prongs of the second weld cap removing portion being separated by a second characteristic gap that is different than the first characteristic gap that is sized to position at least part of the second weld cap removing portion beneath at least a portion of a second weld cap for a removal operation. When the weld cap changing tool is in a first engagement position, the first weld cap removing portion engages the first weld cap and, and when in a second engagement position different from the first engagement position, the second weld cap removing portion engages the second weld cap of a different size than the first weld cap.

In another embodiment, a weld cap changing tool for removing weld caps from weld shanks includes an elongated shaft portion having an elongated axis extending along a length of the shaft portion and a maximum shaft width measured perpendicular to the elongated axis, and a first weld cap removing portion located at a first end of the shaft portion. The first weld cap removing portion includes two prongs extending away from the shaft portion to free distal ends, where the two prongs of the first weld cap removing portion include a lifting surface separated by a first characteristic gap of varying width. The weld cap changing tool also includes a second weld cap removing portion located at a second end of the shaft portion. The second weld cap removing portion includes two prongs extending away from the shaft portion to free distal ends, where the two prongs of the first weld cap removing portion including a lifting surface separated by a second characteristic gap of varying width. The varying widths of at least one of the first and second characteristic gaps is no greater than the maximum shaft width.

In yet another embodiment, a weld cap changing tool for removing weld caps from weld shanks includes an elongated shaft portion, a first weld cap removing portion, and a second weld cap removing portion. The elongated shaft portion has an elongated axis that extends along a length of the shaft portion. The first weld cap removing portion is located at a first end of the shaft portion and engages a first weld cap. The first weld cap removing portion includes two prongs extending away from the shaft portion to free distal ends, where the two prongs of the first weld cap removing portion being separated by a first characteristic gap that is sized to position at least part of the first weld cap removing portion beneath at least a portion of the first weld cap for a removal operation. Both of the two prongs including a lifting surface that is offset from a fulcrum surface of the first weld cap removing portion. The second weld cap removing portion is located at a second end of the shaft portion and engages a second weld cap. The second weld cap removing portion includes two prongs extending away from the shaft portion to free distal ends, where the two prongs of the second weld cap removing portion are separated by a second characteristic gap that is different than the first characteristic gap, and where the second characteristic gap is sized to position at least part of the second weld cap removing portion beneath at least a portion of the second weld cap for a removal operation. Both of the two prongs including a lifting surface that is offset from a fulcrum surface of the second weld cap removing portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 depicts a perspective view of a weld cap changing tool according to one or more embodiments shown and described herein;

FIG. 3 depicts a sectional view of the weld cap changing tool along line 3-3 of FIG. 3;

FIG. 4 depicts a sectional view of the weld cap changing tool along line 4-4 of FIG. 3;

FIG. 5 depicts a top view of a weld cap changing tool according to one or more embodiments shown and described herein;

FIG. 6 depicts a sectional view of the weld cap changing tool along line 6-6 of FIG. 5;

FIG. 11 depicts a side view of a weld cap changing tool according to one or more embodiments shown and described herein;

FIG. 12 depicts a side view of a weld cap changing tool according to one or more embodiments shown and described herein;

FIG. 13 depicts a sectional view of a weld cap according to one or more embodiments shown and described herein;

FIG. 14 depicts a sectional view of a weld cap changing tool removing a weld cap according to one or more embodiments shown and described herein;

FIG. 15 depicts a sectional view of a weld cap changing tool removing a weld cap according to one or more embodiments shown and described herein;

FIG. 16 depicts a sectional view of the weld cap changing tool removing a weld cap along line 16-16 of FIG. 14;

DETAILED DESCRIPTION

Embodiments of the present disclosure generally relate to weld cap changing tools that may be used in conjunction with resistance spot welding machines to remove weld caps from weld shanks. The weld cap changing tools include two removing portions located at either end of a shaft portion. Each of the removing portions include two prongs that extend away from the shaft portion to form distal ends, where the prongs of each removing portion are separated by a characteristic gap. The characteristic gap of each removing portion may be sized such that at least part of the removing portion may be positioned beneath at least a portion of a weld cap. The first characteristic gap and the second characteristic gap may be sized such that the removing portions on a single weld cap changing tool are configured to remove different sizes of weld caps and/or different types of weld caps.

Figure 1:
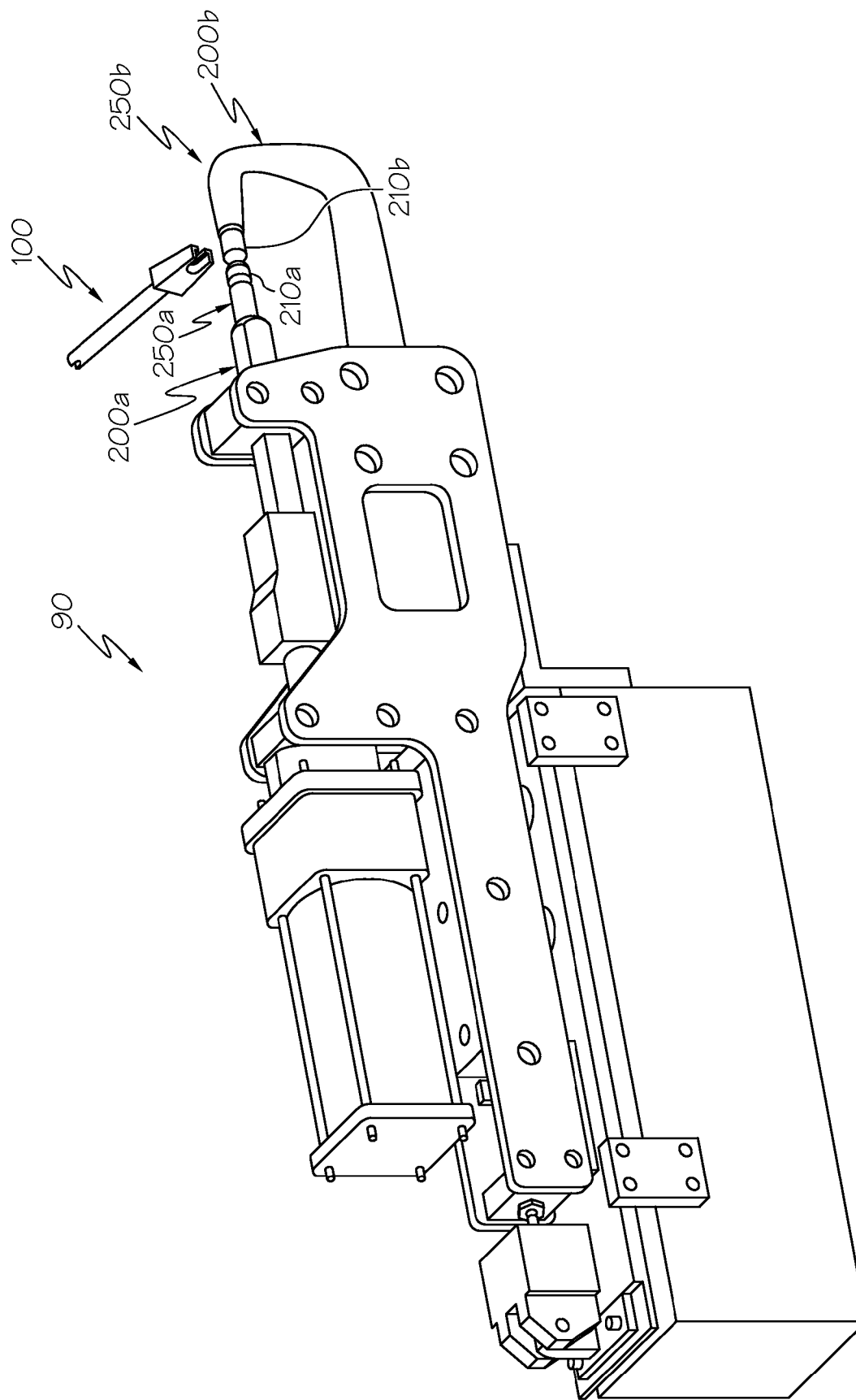
FIG. 1 depicts a perspective view of a weld cap changing tool and a resistance spot welding machine according to one or more embodiments shown and described herein.

One embodiment of the weld cap changing tool 100 is depicted in FIG. 1 in relation to a resistance spot welding machine 90. As discussed later herein, the weld cap changing tool 100 may be used to remove first and second weld caps 210a, 210b from first and second weld shanks 250a, 250b, respectively. Regular removal and replacement of first and second weld caps 210a, 210b may maintain consistent properties of weld joints created by a resistance spot welding machine 90.

The electrodes 200a, 200b of the resistance spot welding machine 90 include first and second weld caps 210a, 210b secured to first and second weld shanks 250a, 250b. To separate the weld caps 210a, 210b from the weld shanks 250a, 250b, the weld cap changing tool 100 may be used. The weld cap changing tool 100 can be manipulated manually by a user to remove a first or second weld cap 210a, 210b from a weld shank 250a, 250b. For weld caps 210a, 210b that are retained on the weld shanks 250a, 250b with a friction fit, the weld cap changing tool 100 may be inserted into a region between the weld caps 210a, 210b and the weld shanks 250a, 250b. A force may be applied to the weld cap changing tool 100 that tends to separate the weld caps 210a, 210b from the weld shank 250a, 250b. Resistance spot welding machines 90 may be mounted in a fixed position, such that the work pieces are positioned relative to the resistance spot welding machine 90. Alternately, resistance spot welding machines 90 may be movable, for example, attached to a welding robot, such that the resistance spot welding machines 90 are positioned relative to the work pieces. Repositioning of the resistance spot weld machine 90 may reduce an operator's access to the first and second weld shanks 250a, 250b for maintenance, and/or may limit the amount of force that the operator can apply to the first and second weld caps 210a, 210b using standard hand tools for removal from the first and second weld shanks 250a, 250b, respectively.

The weld cap changing tool 100 is depicted in FIGS. 2-6. The weld cap changing tool 100 includes an elongated shaft portion 110 having an elongated axis 112 that extends along the length of the shaft portion 110. The weld cap changing tool 100 further includes a first weld cap removing portion 120 located at a first end 114 of the elongated shaft portion 110, and a second weld cap removing portion 130 located at a second end 116 of the elongated shaft portion 110. The first weld cap removing portion 120 includes two prongs 121, 122 that extend away from the shaft portion 110 to free distal ends 123, 124. The two prongs 121, 122 of the first weld cap removing portion 120 may each include an "L"-shaped cross-section that includes a landing portion 127 and side-wall portion 137 that extend orthogonally from the landing portion 127 (FIG. 3). The landing portion 127 of the two prongs 121, 122 are bound on one side by a fulcrum surface 128 and bound on the opposite side by a lifting surface 125. As depicted in FIG. 3, the fulcrum surface 128 and lifting surface 125 may be generally parallel with one another. The thickness of the landing portion 127 is, therefore, defined by the distance from the fulcrum surface 128 to the lifting surface 125. Further, the lifting surface 125 of the first weld cap removing portion 120 extends to the distal ends 123, 124 ends of each of the two prongs 121, 122 of the first weld cap removing portion 120.

The landing of the two prongs 121, 122 include interior edge surfaces 141 that face inwardly between the two prongs 121, 122. The interior edge surfaces 141 of the two prongs 121, 122 define a first characteristic gap 126 of the first weld cap removing portion 120. As depicted in FIGS. 2-6, the first characteristic gap 126 may extend along the first weld cap removing portion 120 from the free distal ends 123, 124 of the two prongs 121, 122 towards the elongated shaft portion 110.

The second weld cap removing portion 130 includes two prongs 131, 132 that extend away from the shaft portion 110 to free distal ends 133, 134. The two prongs 131, 132 of the second weld cap removing portion 130 may each include an "L"-shaped cross-section that includes a landing portion 141 and side-wall portion 143 that extend orthogonally from the landing portion (FIG. 4). The landing portion of the two prongs 131, 132 are bound on one side by a fulcrum surface 138 and bound on the opposite side by a lifting surface 135. The thickness of the landing portion is, therefore, defined by the distance from the fulcrum surface 138 to the lifting surface 135. As depicted in FIG. 4, the fulcrum surface 138 and lifting surface 135 may be generally parallel with one another. Further, the lifting surface 135 of the first weld cap removing portion 130 may extend to the distal ends 133, 134 ends of each of the two prongs 131, 132 of the first weld cap removing portion 130.

The landing of the two prongs 131, 132 include interior edge surfaces 145 that face inwardly between the two prongs 131, 132. The interior edge surfaces 145 of the two prongs 131, 132 define a second characteristic gap 136 of the second weld cap removing portion 130. As depicted in FIGS. 2, 5, and 6, the second characteristic gap 136 may extend along the second weld cap removing portion 130 from the free distal ends 133, 134 of the two prongs 131, 132 towards the elongated shaft portion 110.

In one embodiment, the lifting surface 125 of the two prongs 121, 122 may pass through a proximal end 129 of the first weld cap removing portion 120 to form a continuous surface. Similarly, the lifting surface 135 of the two prongs 131, 132 may pass through a proximal end 139 of the second weld cap removing portion 130 to form a continuous surface.

Referring to FIGS. 5 and 6, one embodiment of the weld cap changing tool 100 may include the lifting surface 125 and the fulcrum surface 128 of the first weld cap removing portion 120 that are both offset in a common direction from the elongated axis 112 of the shaft portion 110. The offset of the lifting surface 125 and the fulcrum surface 128 from the elongated axis 112 of the shaft portion 110 may allow a user of the weld cap changing tool 100 to use the weld cap changing tool 100 in certain applications where clearance is limited. Additionally, the lifting surface 135 and the fulcrum surface 138 of the two prongs 131, 132 of the second weld cap removing portion 130 may be both offset in a common direction from the elongated axis 112 of the shaft portion 110.

In one embodiment, the weld cap changing tool 100 may include the first end 114 of the shaft portion 110 that is connected to the proximal end 129 of the first weld cap removing portion 120. The proximal end 129 of the first weld cap removing portion 120 may extend outwardly from the shaft portion 110 at an angle to the elongated axis 112 of the shaft portion 110. Further, the first weld cap removing portion 120 may taper in a thickness dimension from a proximal end 129 to the distal ends 123, 124 of the two prongs 121, 122.

Figure 7:
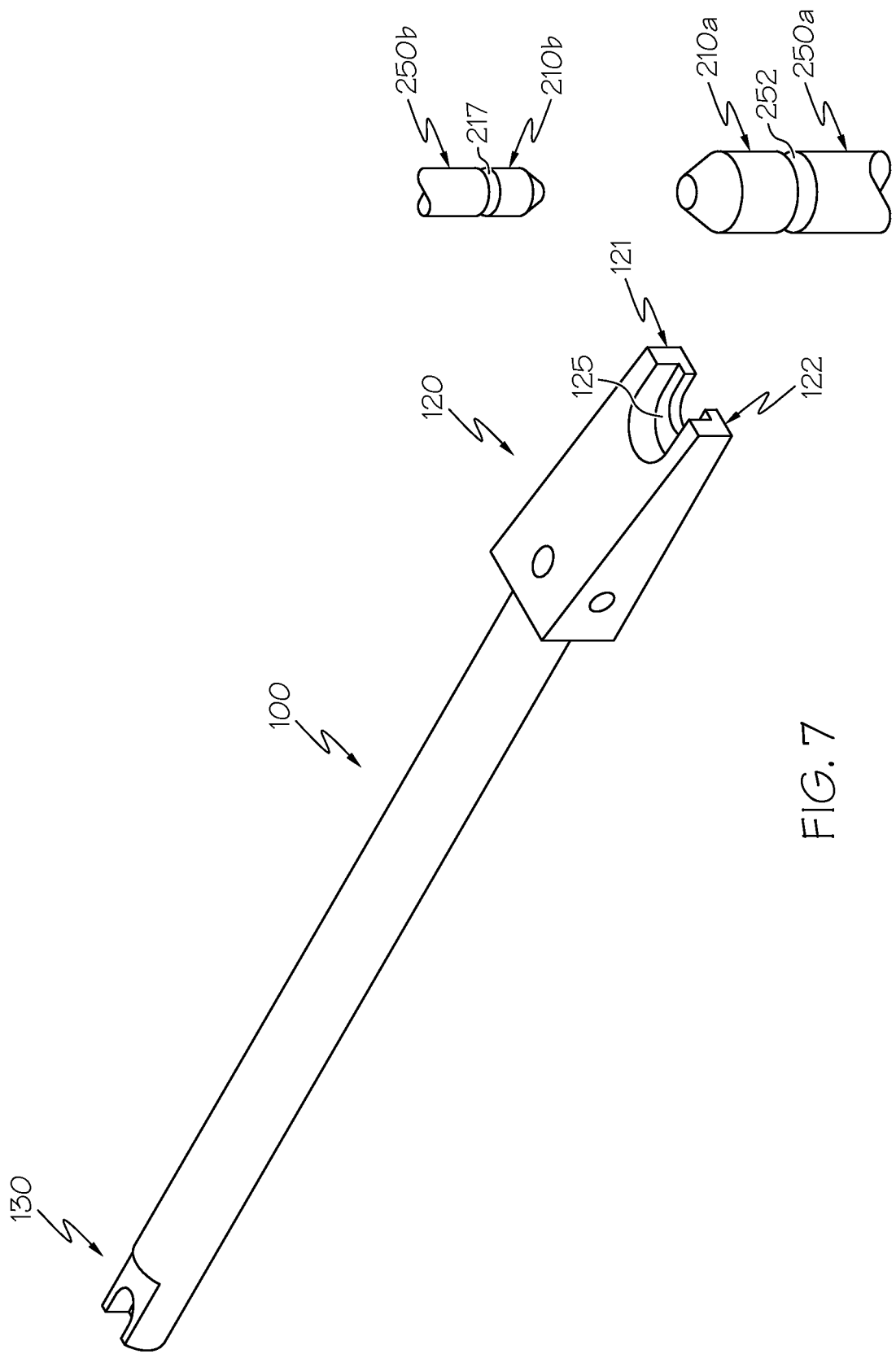
FIG. 7 depicts a perspective view of a weld cap changing tool according to one or more embodiments shown and described herein.
Figure 8:
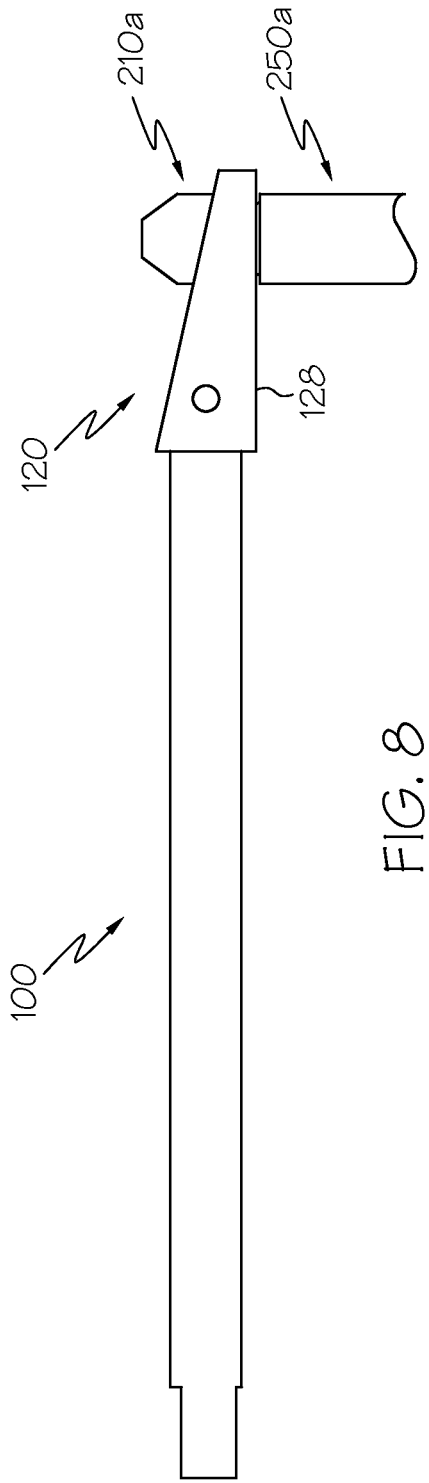
FIG. 8 depicts a side view of a weld cap changing tool according to one or more embodiments shown and described herein.
Figure 9:
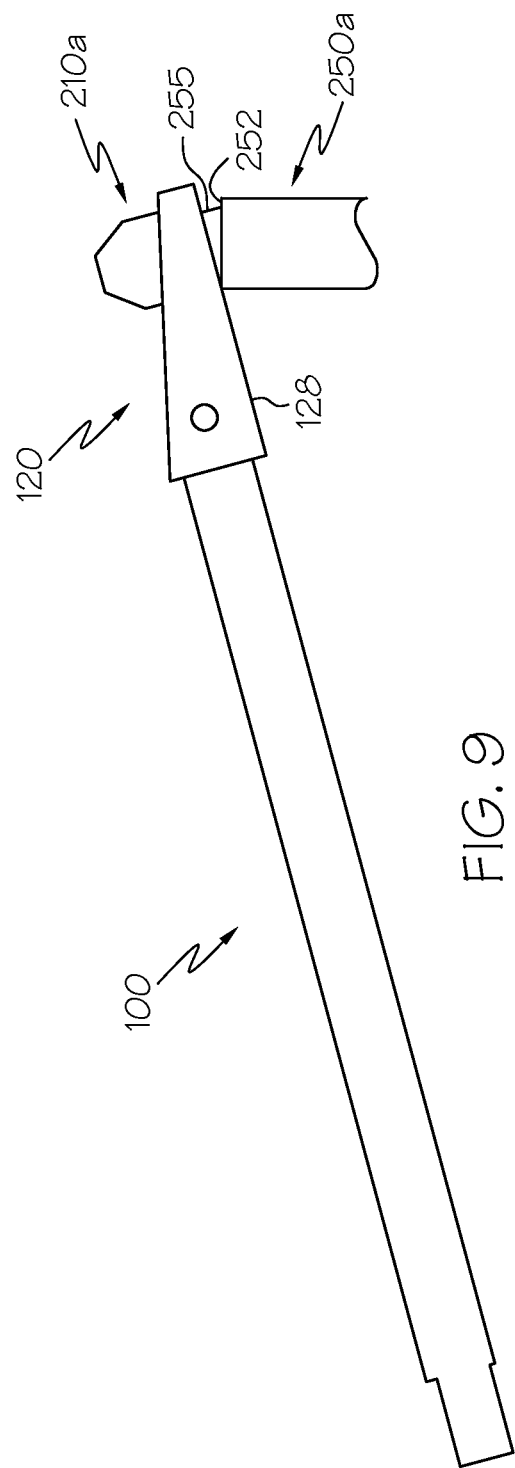
FIG. 9 depicts a side view of a weld cap changing tool according to one or more embodiments shown and described herein.

General operation for removing the first and second weld caps 210a, 210b from the first and second weld shanks 250a, 250b is described with reference to FIGS. 7-12. Because the weld cap changing tool 100 includes the first weld cap removing portion 120 and the second weld cap removing portion 130, a single weld cap changing tool 100 may be used to remove first and second weld caps 210a, 210b that vary in size and/or type. As depicted in FIGS. 7-9, a weld cap changing tool 100 may be placed in a first engagement position such that the first weld cap removing portion 120 is positioned proximate to a first weld cap 210a and first weld shank 250a.

The weld cap changing tool 100 is positioned such that the first weld cap 210a is located between the two prongs 121, 122, with the lifting surface 125 and the fulcrum surface 128 being positioned between a space formed by the first weld cap 210a and the first weld shank 250a. The operator may manually manipulate the weld cap changing tool 100 to apply a force to the first weld cap 210a such that the force tends to remove the first weld cap 210a from the first weld shank 250a.

Figure 10:
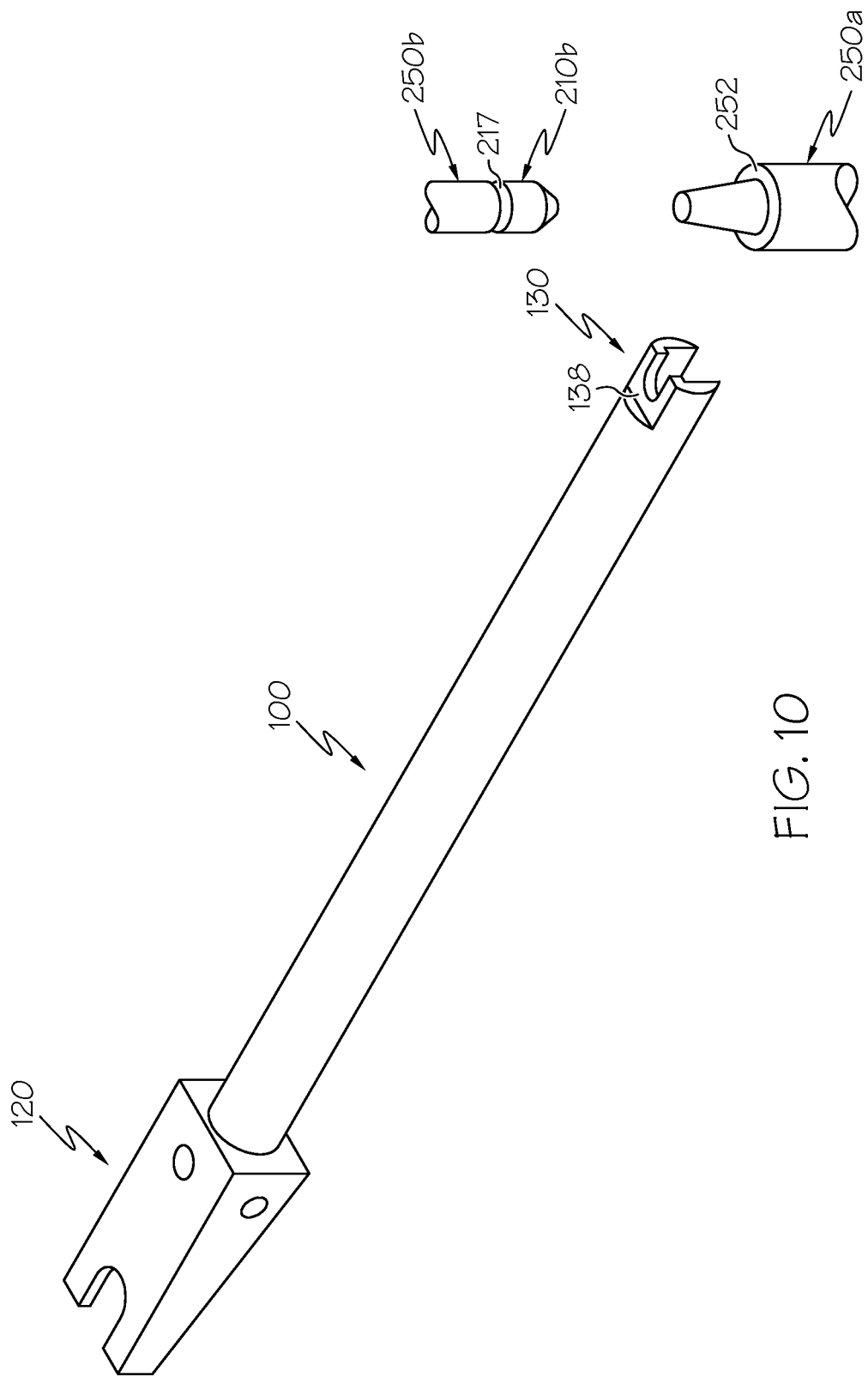
FIG. 10 depicts a perspective view of a weld cap changing tool according to one or more embodiments shown and described herein.

The same weld cap changing tool 100 may be placed into a second engagement position such that the second weld cap removing portion 130 is positioned proximate to the second weld cap 210b and the second weld shank 250b, as depicted in FIGS. 10-12. The weld cap changing tool 100 is positioned such that the two prongs 131, 132 of the second weld cap removing portion 130 surround the second weld cap 210b. The operator may manually manipulate the weld cap changing tool 100 to apply a force to the second weld cap 210b such that the force tends to remove the second weld cap 210b from the second weld shank 250b.

The first weld cap removing portion 120 and the second weld cap removing portion 130 of the weld cap changing tool 100 allow for different sizes and/or types of weld caps (i.e., the first and second weld caps 210a, 210b) to be removed from a welding machine 90 without the operator having to exchange tools. Additionally, because the first weld cap removing portion 120 is sized to remove the first weld cap 210a when placed in the first engagement position, and the second weld cap removing portion 130 is sized to remove the second weld cap 210b when placed in the second engagement position, the first and second weld cap removing portions 120, 130 may be sized to engage the first and second weld cap 210a, 210b irrespective of how deep the first or second weld cap 210a, 210b is placed within the first or second weld cap removing portions 120, 130, respectively. Instead, once the appropriate weld cap removing portion is selected, an operator may position the weld cap such that it is inserted between the two prongs of the weld cap removing portion and manipulate the weld cap changing tool 100 to apply a removal force to the weld cap. Further, the first weld cap removing portion 120 and the second weld cap removing portion 130 allow the operator to apply a removal force to the weld cap without having to apply any gripping force to the weld cap. Instead, the only force an operator is required to apply to the weld cap changing tool 100 is a force that tends to remove the weld cap from the weld shank. Further details of the operation for removing the weld caps 210 will now be discussed.

One type of a weld cap 210, a female weld cap 212, is depicted in FIG. 13. The female weld cap 212 includes a working surface 202 along one axial end of the female weld cap 212. Female weld caps 212 are commercially available having a variety of working surfaces 202 that a user may select from, depending on the requirements of a particular welding application. The female weld cap 212 also includes a weld cap major diameter 214 that is the largest outside diameter of the weld cap 210, and a weld cap removal shoulder 217 that extends inwardly from the weld cap major diameter 214 in a direction generally orthogonal to the weld cap major diameter 214. The female weld cap 212 further includes a tapered bore 215 that extends along the inside of the female weld cap 212, away from the weld cap removal shoulder 217, for a pre-determined distance. The intersection of the weld cap removal shoulder 217 and the tapered bore 215 defines a weld cap taper diameter 216. The tapered bore 215 may be concentric with the weld cap major diameter 214 to maintain alignment of the weld cap 210 with a weld shank. Female weld caps 212 may be commercially available in a series of sizes of weld cap major diameter 214, where the weld cap taper diameter 216 and the weld cap major diameter 214 change size.

The working surface 202 of the weld cap 210 depicted in FIG. 13 extends away from the weld cap major diameter 214 on the side opposite the tapered bore 215. Because the working surface 202 of the weld cap 210 is used to press work pieces against one another prior to and during a welding operation, and because the weld caps 210 may be subjected to elevated temperatures, the working surface 202 of the weld cap 210 tends to wear as more spot weld operations are completed. This wear of the working surface 202 may be viewed as deformation of the weld cap 210 by an operator. To maintain spot welds with the desired characteristics, weld caps 210 that are worn may periodically be inspected and, depending on wear, removed from the weld shanks and replaced with new weld caps 210 that have an unworn working surface 202.

Referring to FIG. 14, when inserted onto a first weld shank 250*a*, the tapered bore 215 of the female weld cap 212 contacts the tapered shank 255 of the first weld shank 250*a*. The distance between the weld cap removal shoulder 217 of the female weld cap 212 and a weld shank shoulder portion 252 of the first weld shank 250*a* defines a seating dimension 218. Friction between the tapered bore 215 and the tapered shank 255 maintains the position of the female weld cap 212 relative to the first weld shank 250*a*. In order to remove the weld cap 210 from the first weld shank 250*a*, the friction force that maintains the position of the weld cap 210 must be overcome.

As depicted in FIG. 14, the weld cap changing tool 100 may be positioned such that the first weld cap removing portion 120 at least partially engages the first weld cap 210*a*. The two prongs 121, 122 of the first weld cap removing portion 120 may be sized to position at least a portion of the first weld cap removing portion 120 beneath at least a portion of the first weld cap 210*a*. The first characteristic gap 126 may be sized such that at least a portion of the first characteristic gap 126 is greater than the weld cap taper diameter 216 of the first weld cap 210*a*, while at least a portion of the first characteristic gap 126 is smaller than the major diameter 214 of the first weld cap 210*a*. In this embodiment, the lifting surface 125 of the first weld cap removing portion 120 may be received beneath the first weld cap 210*a* when the first weld cap 210*a* is positioned between the two prongs 121, 122 of the first weld cap removing portion 120.

Referring to FIGS. 13 and 14, to remove the first weld cap 210*a* from the first weld shank 250*a*, a force may be applied to the weld cap changing tool 100 in a direction that tends to separate the first weld cap 210*a* from the first weld shank 250*a*. In one embodiment, a force may be applied to the weld cap changing tool 100 that translates the first weld cap removing portion 120, and applies a force to the first weld cap 210*a* in a corresponding direction. In the embodiment of the first weld cap removing portion 120, the fulcrum surface 128 contacts the weld shank shoulder portion 252 of the first weld shank 250*a*. In this embodiment, the fulcrum surface 128 is separated from the lifting surface 125 by a distance less than a seating dimension 218 of the first weld cap 210*a* and the first weld shank 250*a*. At least part of the first weld cap removing portion 120 can be inserted beneath at least a portion of the first weld cap 210*a*. When a force is applied to the weld cap changing tool 100 in a direction that tends to pivot the weld cap changing tool 100 about the fulcrum surface 128, the weld cap changing tool 100 pivots freely until the lifting surface 125 of the first weld cap removing portion 120 contacts the removal shoulder 217 of the first weld cap 210*a*. Once the lifting surface 125 contacts the removal shoulder 217, the application of force to the weld cap changing tool 100 is transferred to the removal shoulder 217 in a direction that tends to separate the first weld cap 210*a* from the first weld shank 250*a*.

Comparing FIGS. 14 and 15, the second weld cap 210*b* has a smaller major diameter 214 and a smaller weld cap taper diameter 216 than the first weld cap 210*a*. To accommodate the different sizes of weld caps 210*a*, 210*b*, the spaces between the two prongs 131, 132 of the second weld cap removing portion 130 may be smaller than the spacing between the two prongs 121, 122 of the first weld cap removing portion 120.

As further depicted in FIG. 15, to remove the second weld cap 210*b* from the second weld shank 250*b*, a force may be applied to the weld cap changing tool 100 in a direction that tends to separate the second weld cap 210*b* from the second weld shank 250*b*. In one embodiment, a force may be applied to the weld cap changing tool 100 that translates the second weld cap removing portion 130, and applies a force to the second weld cap 210*b* in a corresponding direction. In another embodiment, the second weld cap removing portion 130 includes the fulcrum surface 138 that contacts the weld shank shoulder portion 252 of the second weld shank 250*b*. In this embodiment, the fulcrum surface 138 is separated from the lifting surface 135 by a distance less than a seating dimension 218 of the second weld cap 210*b* and the second weld shank 250*b*. At least part of the second weld cap removing portion 130 can be inserted beneath at least a portion of the second weld cap 210*b*. In this embodiment, when a force is applied to the weld cap changing tool 100 in a direction that tends to pivot the weld cap changing tool 100 about the fulcrum surface 138, the weld cap changing tool 100 pivots freely until the lifting surface 135 of the second weld cap removing portion 130 contacts the removal shoulder 217 of the second weld cap 210*b*. Once the lifting surface 135 contacts the removal shoulder 217, the application of force to the weld cap changing tool 100 is transferred to the removal shoulder 217 in a direction that tends to separate the second weld cap 210*b* from the second weld shank 250*b*.

As depicted in FIG. 16, because the lifting surface 125 is continuous between the two prongs 121, 122, the first weld cap removing portion 120 may be positioned such that at least a part of the first weld cap removing portion 120 is inserted below half the circumference of the first weld cap 210*a*. In the embodiment depicted in FIG. 16, the lifting surface 125 (not shown) contacts the removal shoulder 217 around about half of the circumference of the first weld cap 210*a*.

Figure 17:
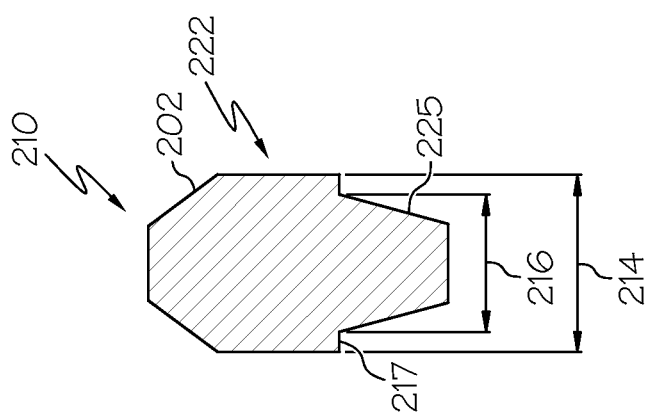
FIG. 17 depicts a sectional view of a weld cap according to one or more embodiments shown and described herein.

A second type of a weld cap 210, a male weld cap 222, is depicted in FIG. 17. The male weld cap 222 includes a weld cap major diameter 214, a tapered protrusion 225 that extends along an exterior portion of the male weld cap 222, beginning at a weld cap removal shoulder 217. The intersection of the tapered protrusion 225 and the weld cap removal shoulder 217 defines a weld cap taper diameter 216. Male weld caps 222 are commercially available with a variety of working surfaces 202 that a user may select from, depending on the requirements of a particular welding application. Male weld caps 222 are also available in a series of sizes of weld cap major diameter 214, where the size of the weld cap taper diameter 216 changes in size relative to the size of the weld cap major diameter 214.

Figure 19:
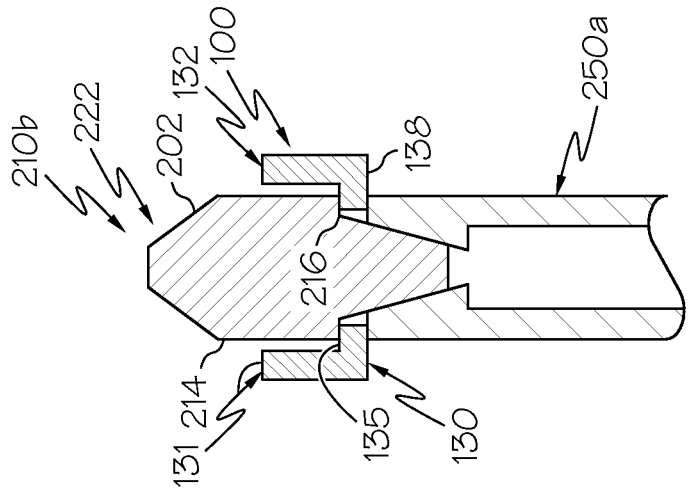
FIG. 19 depicts a sectional view of a weld cap changing tool removing a weld cap according to one or more embodiments shown and described herein.
Figure 18:
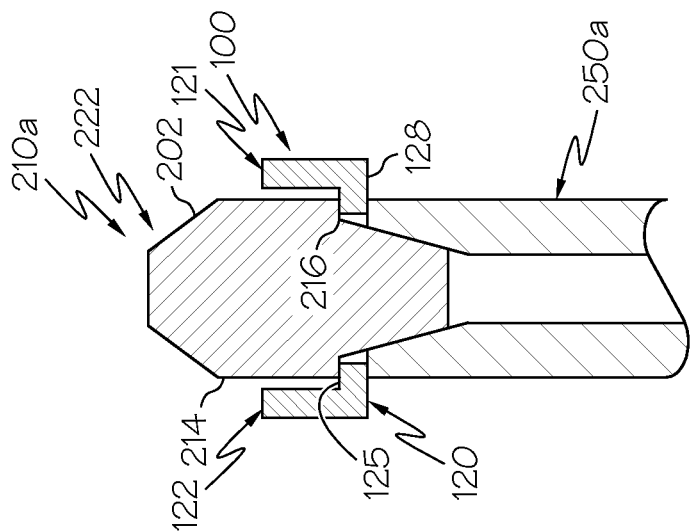
FIG. 18 depicts a sectional view of a weld cap changing tool removing a weld cap according to one or more embodiments shown and described herein.

Similar to the discussion above in regard to FIGS. 14 and 15, the weld cap changing tool 100 depicted in FIGS. 18 and 19 may include a first weld cap removing portion 120 that is configured to remove a first weld cap 210*a*, here the male weld cap 222, from a first weld shank 250*a*, and a second weld cap removing portion 130 that is configured to remove a second weld cap 210b, also the male weld cap 222, from a second weld shank 250b.

In one embodiment of the weld cap changing tool 100, the first weld cap removing portion 120 is configured to remove one of a male weld cap 222 or a female weld cap 212 and the second weld cap removing portion 130 is configured to remove the opposite of the male weld cap 222 or the female weld cap 212.

Figure 20:
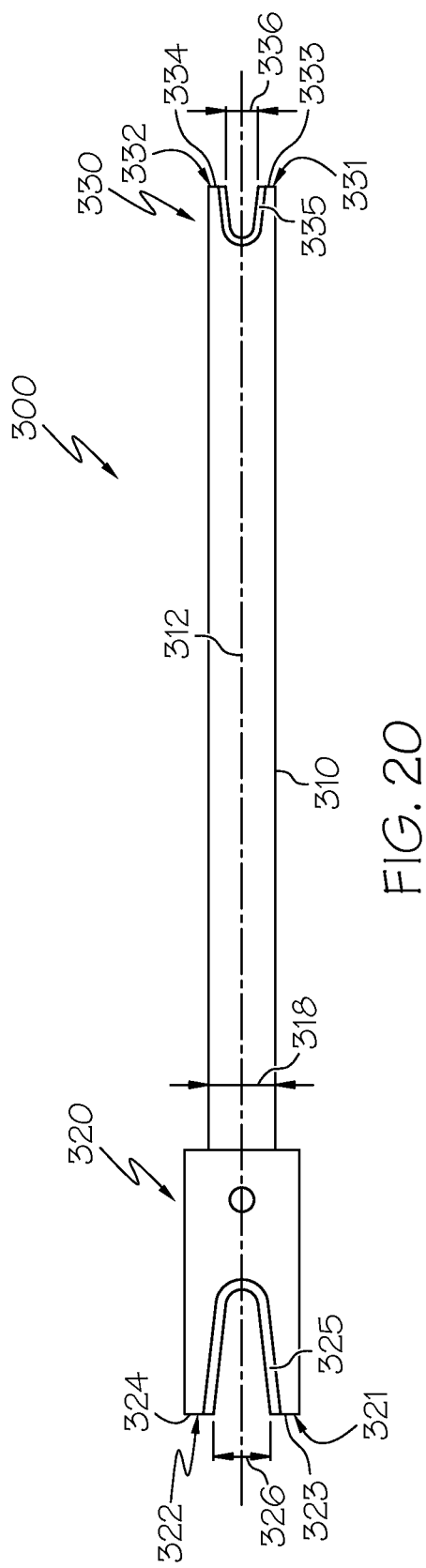
FIG. 20 depicts a top view of a weld cap changing tool according to one or more embodiments shown and described herein.
Figure 21:
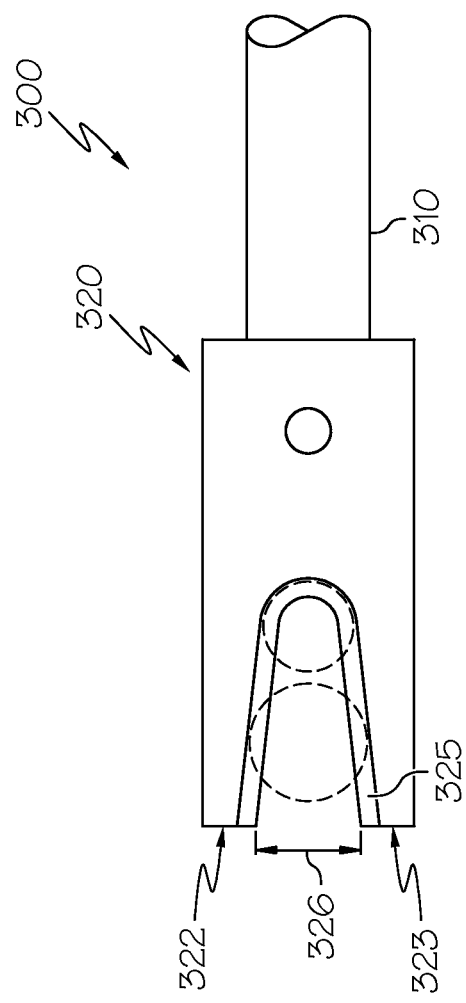
FIG. 21 depicts a top view of a weld cap changing tool according to one or more embodiments shown and described herein.

As depicted in FIGS. 20 and 21, another embodiment of a weld cap changing tool 300 may include many of the same or similar features described above including an elongated shaft portion 310 having an elongated axis 312 extending along a length of the shaft portion 310 and a maximum shaft width 318 measured perpendicular to the elongated axis. The weld cap changing tool 300 may further include a first weld cap removing portion 320 located at a first end of the shaft portion 310, where the first weld cap removing portion 320 includes two prongs 321, 322 extending away from the shaft portion 310 to free distal ends 323, 324, the two prongs 321, 322 of the first weld cap removing portion 320 including lifting surfaces 325 separated by a first characteristic gap 326 of varying width. The weld cap changing tool 300 may further include a second weld cap removing portion 330 located at a second end of the shaft portion 310, where the second weld cap removing portion 330 includes two prongs 331, 332 extending away from the shaft portion 310 to free distal ends 333, 334, the two prongs 331, 332 of the second weld cap removing portion 330 including a lifting surface 335 separated by a second characteristic gap 336 of varying width.

The widest width of the first characteristic gap 326 occurs at the free distal ends 323, 324 of the two prongs 321, 322 of the first weld cap removing portion 320. Similarly, the widest width of the second characteristic gap 336 occurs at the free distal ends 333, 334 of the two prongs 331, 332 of the second weld cap removing portion 330. Additionally, as depicted in FIG. 20, the widest portion of the second characteristic gap 336 is no greater than the maximum shaft width 318 of the shaft portion 310.

The varying width of the first characteristic gap 326 and the second characteristic gap 336 may allow the weld cap changing tool 300 to be positioned at least partially beneath weld caps having various major diameters and taper diameters. The varying width of the first characteristic gap 326 and the second characteristic gap 336 may allow an operator to determine by touch digitally if the characteristic gap is secured around the weld cap taper diameter. This may allow an operator to determine that the lifting surface 325, 335 is inserted properly, adjacent to the weld cap removal shoulder, without visual inspection.

The above-described weld cap changing tools facilitate removal of weld caps of different sizes and/or types using a single weld cap changing tool. In other words, multiple tools are not needed to remove weld caps of different sizes and/or types. The prongs allow the operator to reliably apply a removal force to the weld caps without requiring precision in locating the depth of the weld cap relative to the weld cap removal portion, and without requiring the application of a gripping force to the weld cap, for example, such as would be needed using pliers.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

What is claimed is:

1. A weld cap changing tool for removing weld caps from weld shanks, comprising:
    an elongated shaft portion having an elongated axis extending along a length of the shaft portion;
    a first weld cap removing portion comprising two prongs extending away from the shaft portion to free distal ends, the two prongs comprising a lifting surface and a fulcrum surface that are spaced apart from one another, where the lifting surface and the fulcrum surface are generally parallel with one another and are both offset in a common direction from the elongated axis of the shaft portion, and the two prongs of the first weld cap removing portion being separated by a first characteristic gap that is sized to position at least part of the first weld cap removing portion beneath at least a portion of a first weld cap for a removal operation; and
    a second weld cap removing portion comprising two prongs extending away from the shaft portion to free distal ends, the two prongs comprising a lifting surface and a fulcrum surface that are spaced apart from one another, where the lifting surface and the fulcrum surface are generally parallel with one another and are both offset in a common direction from the elongated axis of the shaft portion, and the two prongs of the second weld cap removing portion being separated by a second characteristic gap that is different than the first characteristic gap that is sized to position at least part of the second weld cap removing portion beneath at least a portion of a second weld cap for a removal operation;
    wherein, in a first engagement position, the first weld cap removing portion engages the first weld cap and, in a second engagement position different from the first engagement position, the second weld cap removing portion engages the second weld cap of a different size than the first weld cap.

2. The weld cap changing tool of claim 1, wherein the first weld cap removing portion and the second weld cap removing portion are configured to remove different types of weld caps.

3. The weld cap changing tool of claim 2, wherein each of the two prongs of the first weld cap removing portion includes a lifting surface where the lifting surface is sized to be received beneath the first weld cap in the first engagement position with the first weld cap located between the two prongs of the first weld cap removing portion.

4. The weld cap changing tool of claim 3, wherein the two prongs of the first weld cap removing portion are L-shaped in cross-section.

5. The weld cap changing tool of claim 3, wherein the lifting surface of the two prongs of the first weld cap removing portion is connected through a proximal end of the first weld cap removing portion.

6. The weld cap changing tool of claim 2, wherein each of the two prongs of the second weld cap removing portion includes a lifting surface where the lifting surface is sized to be received beneath the second weld cap in the second engagement position with the second weld cap located between the two prongs of the second weld cap removing portion.

7. The weld cap changing tool of claim 6, wherein the two prongs of the second weld cap removing portion are L-shaped in cross-section evaluated in an orientation transverse to the elongated axis of the shaft portion.

8. The weld cap changing tool of claim 6, wherein the lifting surface of the two prongs of the second weld cap removing portion is connected through a proximal end of the second weld cap removing portion.

9. The weld cap changing tool of claim 1, wherein the first weld cap removing portion has a proximal end connected to a first end of the shaft portion, the proximal end extending outwardly from the shaft portion at an angle to the elongated axis of the shaft portion and the second weld cap removing portion has a proximal end connected to a second, opposite end of the shaft portion.

10. The weld cap changing tool of claim 9, wherein the first weld cap removing portion tapers in dimension from the proximal end to the free distal ends of the two prongs of the first weld cap removing portion.

11. A weld cap changing tool for removing weld caps from weld shanks, comprising:
   an elongated shaft portion having an elongated axis extending along a length of the shaft portion and a maximum shaft width measured perpendicular to the elongated axis;
   a first weld cap removing portion located at a first end of the shaft portion, the first weld cap removing portion including two prongs extending away from the shaft portion to free distal ends, the two prongs of the first weld cap removing portion including a lifting surface separated by a first characteristic gap of varying width and a fulcrum surface that is spaced apart from the lifting surface, where the lifting surface and the fulcrum surface are generally parallel with one another and are both offset in a common direction from the elongated axis of the shaft portion; and
   a second weld cap removing portion located at a second end of the shaft portion, the second weld cap removing portion including two prongs extending away from the shaft portion to free distal ends, the two prongs of the first weld cap removing portion including a lifting surface separated by a second characteristic gap of varying width and a fulcrum surface that is spaced apart from the lifting surface, where the lifting surface and the fulcrum surface are generally parallel with one another and are both offset in a common direction from the elongated axis of the shaft portion;
   wherein the varying widths of at least one of the first and second characteristic gaps is no greater than the maximum shaft width.

12. The weld cap changing tool of claim 11, wherein the first characteristic gap of the first weld cap removing portion is widest at the free distal ends.

13. The weld cap changing tool of claim 11, wherein the second characteristic gap of the second weld cap removing portion is widest at the free distal ends.

14. A weld cap changing tool for removing weld caps from weld shanks, comprising:
   an elongated shaft portion having an elongated axis extending along a length of the shaft portion;
   a first weld cap removing portion located at a first end of the shaft portion that engages a first weld cap, the first weld cap removing portion including two prongs extending away from the shaft portion to free distal ends, the two prongs of the first weld cap removing portion being separated by a first characteristic gap that is sized to position at least part of the first weld cap removing portion beneath at least a portion of the first weld cap for a removal operation, both of the two prongs of the first weld cap removing portion including a lifting surface that is offset from a fulcrum surface of the first weld cap removing portion, where the lifting surface and the fulcrum surface are generally parallel with one another and are both offset in a common direction from the elongated axis of the shaft portion;
   and a second weld cap removing portion located at a second end of the shaft portion that engages a second weld cap, the second weld cap removing portion including two prongs extending away from the shaft portion to free distal ends, the two prongs of the second weld cap removing portion being separated by a second characteristic gap that is different than the first characteristic gap, where the second characteristic gap is sized to position at least part of the second weld cap removing portion beneath at least a portion of the second weld cap for a removal operation, both of the two prongs of the second weld cap removing portion including a lifting surface that is offset from a fulcrum surface of the second weld cap removing portion, where the lifting surface and the fulcrum surface are generally parallel with one another and are both offset in a common direction from the elongated axis of the shaft portion.

15. The weld cap changing tool of claim 11, wherein the two prongs of the second weld cap removing portion are L-shaped in cross-section evaluated in an orientation transverse to the elongated axis of the shaft portion.

16. The weld cap changing tool of claim 14, wherein the two prongs of the second weld cap removing portion are L-shaped in cross-section evaluated in an orientation transverse to the elongated axis of the shaft portion.

* * * * *